US011070396B2

(12) United States Patent
Anshuman et al.

(10) Patent No.: US 11,070,396 B2
(45) Date of Patent: Jul. 20, 2021

(54) VIRTUAL CLOUD EXCHANGE SYSTEM AND METHOD

(71) Applicant: Tata Communications Transformation Services (US) Inc., Dover, DE (US)

(72) Inventors: Vineet Anshuman, Santa Clara, CA (US); Ved Prakash Singh, Dighi-Pune (IN); Ebrahim Attarwala, Dighi-Pune (IN); Amit Borkar, Dighi-Pune (IN)

(73) Assignee: Tata Communications Transformation Services (US) Inc., Dover, DE (US)

( * ) Notice: Subject to any disclaimer, the term of this patent is extended or adjusted under 35 U.S.C. 154(b) by 76 days.

(21) Appl. No.: 16/678,812

(22) Filed: Nov. 8, 2019

(65) Prior Publication Data
US 2020/0322182 A1 Oct. 8, 2020

Related U.S. Application Data

(60) Provisional application No. 62/874,181, filed on Jul. 15, 2019.

(30) Foreign Application Priority Data
Apr. 4, 2019 (IN) .............................. 201921013733

(51) Int. Cl.
*H04L 12/46* (2006.01)
*H04L 29/12* (2006.01)
*G06F 9/455* (2018.01)

(52) U.S. Cl.
CPC ...... *H04L 12/4633* (2013.01); *G06F 9/45558* (2013.01); *H04L 12/4679* (2013.01);
(Continued)

(58) Field of Classification Search
CPC ....... G06F 2009/45595; G06F 9/45558; H04L 12/4633; H04L 12/4679; H04L 61/2514;
(Continued)

(56) References Cited

U.S. PATENT DOCUMENTS

2015/0180769 A1* 6/2015 Wang .................. H04L 47/2483
370/236
2015/0372929 A1* 12/2015 Rochwerger ............ H04L 47/24
709/238

(Continued)

*Primary Examiner* — Robert J Lopata
(74) *Attorney, Agent, or Firm* — Kaplan Breyer Schwarz, LLP (57) ABSTRACT

A Virtual Cloud Exchange (VCX) and method for establishing connectivity between a host computer in a customer network and a cloud service provider, includes a customer facing software defined network (SDN) switch; a cloud computing service facing SDN switch; and a processor executing instructions to generate a customer facing network routing virtual network function (VNF) and a cloud facing network routing VNF; and configure a first open virtual switch (vSwitch) and a second open vSwitch. The customer facing SDN switch generates a first overlay tunnel between the customer facing SDN switch and the first open vSwitch and the cloud facing SDN switch generates a second overlay tunnel between the cloud facing SDN switch and the second open vSwitch.

23 Claims, 8 Drawing Sheets

(52) U.S. Cl.
CPC ...... *H04L 61/2567* (2013.01); *H04L 61/2592* (2013.01); *G06F 2009/45595* (2013.01)

(58) Field of Classification Search
CPC ............. H04L 61/2521; H04L 61/2567; H04L 61/2592
USPC ......................................................... 370/254
See application file for complete search history.

(56) References Cited

U.S. PATENT DOCUMENTS

| | | | |
|---|---|---|---|
| 2016/0127241 A1* | 5/2016 | Hwang | H04L 41/0893 |
| | | | 370/237 |
| 2017/0195255 A1* | 7/2017 | Pham | H04L 41/20 |
| 2017/0374318 A1* | 12/2017 | Yang | G06F 8/61 |
| 2018/0048593 A1* | 2/2018 | Tian | H04L 41/0813 |
| 2018/0307522 A1* | 10/2018 | Wu | G06F 9/5083 |
| 2018/0309718 A1* | 10/2018 | Zuo | H04L 61/103 |
| 2019/0245782 A1* | 8/2019 | Jin | H04L 49/252 |
| 2020/0322223 A1* | 10/2020 | Wang | H04L 12/4641 |
| 2020/0374127 A1* | 11/2020 | Wei-Kocsis | H04L 45/38 |
| 2020/0382420 A1* | 12/2020 | Suryanarayana | H04L 69/164 |
| 2021/0029515 A1* | 1/2021 | Han | H04W 76/12 |

* cited by examiner

VIRTUAL CLOUD EXCHANGE SYSTEM AND METHOD

RELATED APPLICATIONS

This application claims the benefit of Indian Application Serial No. 201921013733, filed Apr. 4, 2019 and U.S. Provisional Patent Application Ser. No. 62/874,181, filed Jul. 15, 2019, the entire disclosures of which are incorporated herein by reference.

FIELD

The present disclosure relates to cloud connectivity and, more particularly, to systems and methods for connecting enterprises to one or more clouds via their managed networks.

BACKGROUND

With the evolution of the industry of clouds, more and more enterprises want connectivity to one or more clouds via their managed networks (i.e.: MPLS, CE, etc.). While the Internet provides ubiquitous connectivity to almost any place in the world, many medium to large enterprises want to utilize managed networks to provide performance guarantees and security postures when connecting to multiple clouds for SaaS services. This new demand by enterprises provide some novel approaches and inventions for all kinds of new services that service providers can offer to their enterprises.

While some enterprises want to connect to clouds using managed networks, connectivity by any of the major SaaS cloud providers usually utilize a layer 3 model in which basic connectivity between the enterprises and cloud is provided using layer 2 Ethernet thereby pushing the layer 3 provisioning, administration and management to the enterprise directly instead of being managed by the service provider.

SUMMARY

Disclosed herein is a Virtual Cloud Exchange (VCX). The VCX is an all software approach, thereby providing layer 3 and more services to a given tenant, all being managed by a given service provider as part of their managed network offering. AVCX can be implemented in any of the service provider's Point-of-Presence (PoP) in which a given tenant can have an instance of a layer 3 peering session with any given cloud provider, all being managed by the service provider directly, thereby extending the managed network services to include cloud connectivity with Network Address Translation (NAT) from private to public address namespaces, including invoking optional various virtualized security functions.

The VCX platform comprises a Lifecycle Service Orchestrator (LSO), Software Defined Network (SDN) controllers and an NFV infrastructure, which fully deliver a VCX utilizing one or more general-purpose computers.

Virtual Network Functions (VNFs) are instantiated by the LSO, which allows a given tenant to self-provision via a portal their intentions to connect to a given cloud provider. The LSO instantiates a set of VNFs for the given tenant automatically, on an already established NFV Infrastructure that is shared between all tenants. The LSO sends the necessary commands to setup a set of routing and Network Address Translation (NAT) VNFs in which a first virtual router faces the given tenant and a second virtual router faces a cloud provider. A NAT VNF is placed in between the first and second virtual routers to convert private to public addresses from the enterprise/tenant to the cloud where needed. The LSO further provides the ability to specify layer 3 route policies on what Internet Protocol (IP) routes get advertised from the cloud provider into the enterprise. As IP routes are advertised from the provider, the LSO via its IP route polices, orchestrates what IP routes gets redistributed into the enterprise via the first virtual router. In the opposite direction, route from the enterprises are mostly private addresses. Since most cloud providers ignore private IP routes, the NAT cloud facing interface public IP address(es) are instead advertised to the cloud provider.

Therefore, one aspect of the disclosure is a method for establishing connectivity between a host computer in a customer network and a cloud service provider. The method comprises: providing a customer facing software defined network (SDN) switch and a cloud service provider facing SDN switch; instantiating, with a processor, a customer facing network routing virtual network function (VNF) and a cloud facing network routing VNF; configuring, with the processor, a first open virtual switch (vSwitch) associated with the customer facing network routing VNF and a second open vSwitch associated with the cloud facing network routing VNF; generating with the customer facing SDN switch a first overlay tunnel between the customer facing SDN switch and the first open vSwitch; and generating with the cloud facing SDN switch a second overlay tunnel between the cloud facing SDN switch and the second open vSwitch.

The method can further comprise instantiating, with the processor, one or more VNFs each based on requirements of a customer, entered at a portal using the host computer.

The method can further comprise bi-directional network address translating the customer facing network routing VNF and the cloud facing network routing VNF.

The method can further comprise receiving IP routes for cloud services from a cloud service provider router, at the cloud facing network routing VNF through a first external Border Gateway Protocol session.

The method can further comprise filtering the IP routes for cloud services received at the cloud facing virtual router with an IP policy controller.

The method can further comprise advertising the IP routes for cloud services received at the cloud facing virtual router to the customer facing virtual router through an internal Border Gateway Protocol session.

The method can further comprise receiving the IP routes for cloud services from the customer facing virtual router, at a customer router through a second E-BGP session.

In some embodiments of the method, the first and second overlay tunnels are Virtual Extensive Local Area Network (VxLAN) tunnels.

In some embodiments of the method, the VxLAN tunnels include a unique VxLAN Network Identifier ID corresponding to each tenant of the customer network.

A further aspect of the disclosure is a system for establishing connectivity between a host computer in a customer network and a cloud service provider. The system comprises: a customer facing software defined network (SDN) switch; a cloud computing service facing SDN switch; and a processor executing instructions to: instantiate a customer facing network routing virtual network function (VNF) and a cloud facing network routing VNF; and configure a first open virtual switch (vSwitch) and a second open vSwitch; wherein the customer facing SDN switch generates a first overlay tunnel between the customer facing SDN switch and the first open vSwitch; and wherein the cloud facing SDN switch generates a second overlay tunnel between the cloud facing SDN switch and the second open vSwitch.

In some embodiments of the system, the system comprises Virtual Cloud Exchange.

The system can further comprise a portal, wherein the processor executes further instructions to: instantiate one or more VNFs each based on requirements of a customer, entered at the portal using the host computer.

The processor of the system can execute further instructions to bi-directional network address translate the customer facing network routing VNF and the cloud facing network routing VNF.

The processor of the system can execute further instructions to receive IP routes for cloud services from a cloud service provider router, at the cloud facing network routing VNF through a first external Border Gateway Protocol session.

The processor of the system can execute further instructions to filter the IP routes for cloud services received at the cloud facing virtual router with an IP policy controller.

The processor of the system can execute further instructions to advertise the IP routes for cloud services received at the cloud facing virtual router to the customer facing virtual router through an internal Border Gateway Protocol session.

The processor of the system can execute further instructions to receive the IP routes for cloud services from the customer facing virtual router, at a customer router through a second E-BGP session.

In some embodiments of the system, the first and second overlay tunnels are first and second Virtual Extensive Local Area Network (VxLAN) tunnels.

In some embodiments of the system, the VxLAN tunnels include a unique VxLAN Network Identifier ID corresponding to each tenant of the customer network.

The processor of the system can execute further instructions to deploy a Lifecycle Service Orchestration (LSO) engine.

The LSO engine of the system can deploy a Networks Function Virtualization orchestrator that instantiates the customer facing network routing VNF and the cloud facing network routing VNF.

The LSO engine of the system can further deploy a VNF manager that manages the life cycle of the customer facing network routing VNF and the cloud facing network routing VNF.

The LSO engine of the system can further deploy a virtual infrastructure manager that manages a Networks Function Virtualization Infrastructure.

BRIEF DESCRIPTION OF THE DRAWING

The disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and the drawing.

DETAILED DESCRIPTION

Figure 1:
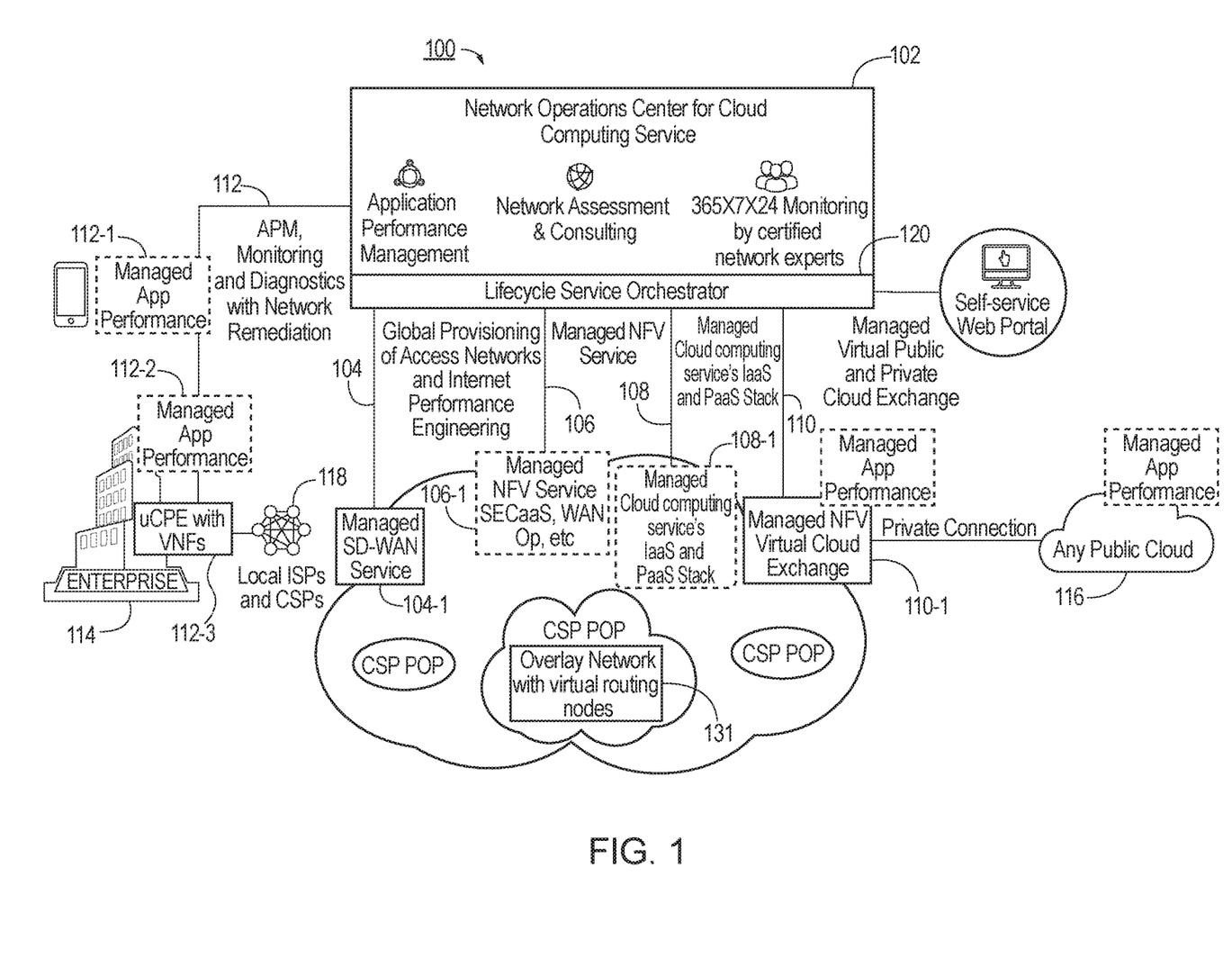
FIG. 1 is a schematic diagram of the network architecture of a Virtualized Cloud Exchange (VCX) according to an exemplary embodiment of the present disclosure.
Figure 2:
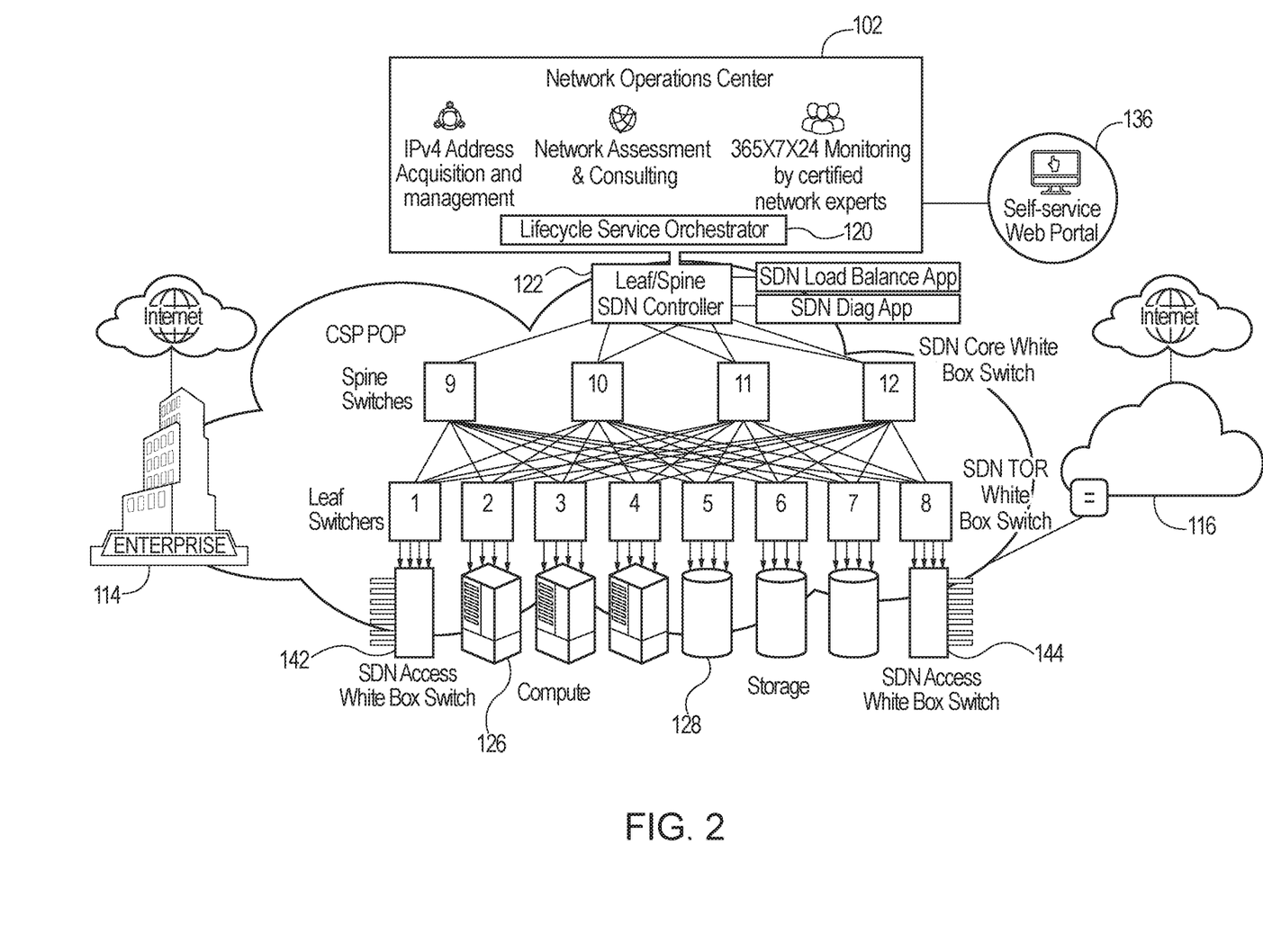
FIG. 2 is a schematic diagram of the Software Defined Network (SDN) components of the VCX according to an exemplary embodiment of the present disclosure.

Referring now to the drawing and initially to FIGS. 1 and 2, there is shown an exemplary embodiment of a Virtualized Cloud Exchange (VCX) 100 of the present disclosure. The VCX 100 is configured as a multitenant virtualized services platform that uses Software Defined Networking (SDN) and Networks Function Virtualization (NFV).

In multitenant solutions, a single instance of software and its supporting infrastructure serves multiple customers. Each customer shares the software application and a single database. Each tenant's data is isolated and remains invisible to other tenants.

Figure 5:
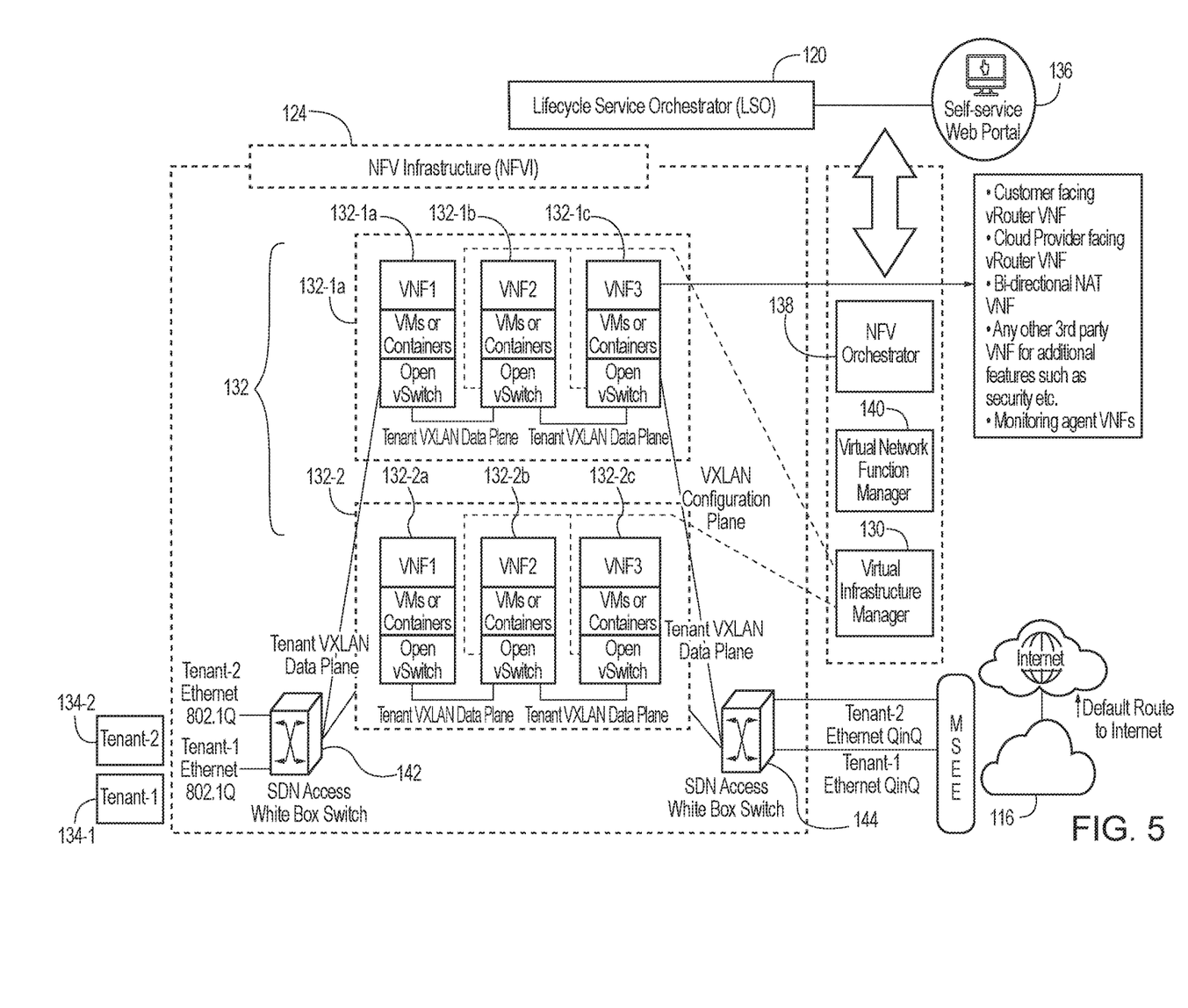
FIG. 5 is a schematic diagram of the Multi-tenant Networks Function Virtualization based architecture of the VCX, according to an exemplary embodiment of the present disclosure.

The VCX 100 comprises a Lifecycle Service Orchestration (LSO) engine 120, a SDN controller 122 and a Networks Function Virtualization Infrastructure (NFVI) 124 (see FIG. 5). In preferred embodiments, the VCX 100 is implemented entirely in software on one or more general-purpose computers 126 and general-purpose computer storage 128 (hereinafter central server 126) in a VCX Point-of-Presence (POP) 162 (FIG. 3A) and through LSO portals 136 and monitoring tools, which are managed and monitored in Network Operations Center 102.

The VCX 100 is configured to support layer-2 (data link network layer), layer-3 Network Address Translation (NAT) functionality, and any layer-4 (transport layer) to layer-7 (application layer) function that employs Virtualized Network Functions (VNFs) 132, using a standards-based Virtual Infrastructure Manager (VIM) 130 and a scaled out NFVI architecture 124 as shown in FIG. 5. The LSO engine 120 of the VCX 100 is configured to instantiate a set of VNFs 132-1, 132-2 for each given customer network tenant 134-1, 134-2 automatically, on the already established NFVI 124 that is shared between all the tenants 134-1, 134-2. The LSO engine 120 of the VCX 100 is further configured to instantiate additional VNFs for various functions based on tenant requirements in full software embodiments. One of ordinary skill in the art will recognize from present disclosure that the VCX 100 will allow public cloud providers to seamlessly expand their footprint without facing challenges of asymmetrical routing when they provide their services to enterprises in emerging economies of the world.

Referring again to FIG. 1, the VCX 100 enables operators 118, particularly tier-2 and tier-3 operators, such as local Internet Service Providers (ISPs) and Communication Service Providers (CSPs), to deliver SDN and NFV, i.e., an overlay network 131 with virtual routing nodes (e.g., VNFs 132-1, 132-2 shown in FIG. 5), using managed services of the VCX 100, which services can be white labeled (branded by the operator) based on a given operator's requirements. The managed services provided by the VCX 100 can include, without limitation, global provisioning of access networks and internet performance engineering 104, such as managed Software Defined-Wide Area Network (SD-WAN) services 104-1; managed NFV services 106, such as managed Security as a Service (SECaaS) and/or WAN optimization 106-1; managed cloud computing services 108, such as Software as a Service (SaaS), Infrastructure as a Service (IaaS) and/or Platform as Service (PaaS) 108-1; managed Virtual Public and Private Cloud Exchange services 110, such as managed NFV Virtual Cloud Exchanges 110-1; and Application Performance Management, Monitoring and Diagnostics with Network Remediation Service 112, such as Managed App Performance 112-1, 112-2 and/or managed Universal Customer Premises Equipment (uCPE) with VNFs 112-3. The VCX 100 enables enterprises 114 (also referred to herein as tenants or service provider subscribers) to connect to various types of clouds 116 via managed service provider networks and/or via data center co-locations.

The VCX 100 further includes a portal 136 from the LSO engine 120 hosted within the service provider's network, which allows service provider subscribers to self-provision themselves. The LSO portal 136 allows a service provider subscriber to directly place their intent into the LSO portal 136, and in response, the LSO engine 120 orchestrates and automates an end-to-end (E2E) workflow in accordance with the methods of the present disclosure including E2E testing and activation. The subscriber, at any given time, can use the LSO portal 136 to access how well their managed network connection to a given cloud is performing and/or the topology and configuration that was automated, via the LSO engine 120 of the VCX 100. Therefore, the VCX 100 eliminates the need for the staff of the service provider to manually insert any workflow processes.

Due to the use of SDN and NFV, the VCX 100 allows a given service provider subscriber to connect into existing Multi-Protocol Label Switching (MPLS), Customer Edge (CE) or WAN technologies. As shown in FIG. 5, configuring the VCX 100 with SDN and NFV enables a service provider, via the LSO engine 120, to deploy a NFV orchestrator 138 that instantiates VNFs, a VNF manager (VNFM) 140 that manages the life cycle of the VNFs instantiated by the NFV orchestrator, and the earlier mentioned VIM 130 that manages the NFVI 124 (e.g., configures server tunneling end points). In addition, the VCX 100 includes a shared customer facing SDN infrastructure access switch 142 and a shared cloud facing SDN infrastructure access switch 144, which are operative for implementing a virtualized layer-2 over a layer-3 tunneling technology, such as Virtual Extensible Local Area Network (VXLAN) or Network Virtualization using Generic Routing Encapsulation (NVGRE).

Figure 3A:
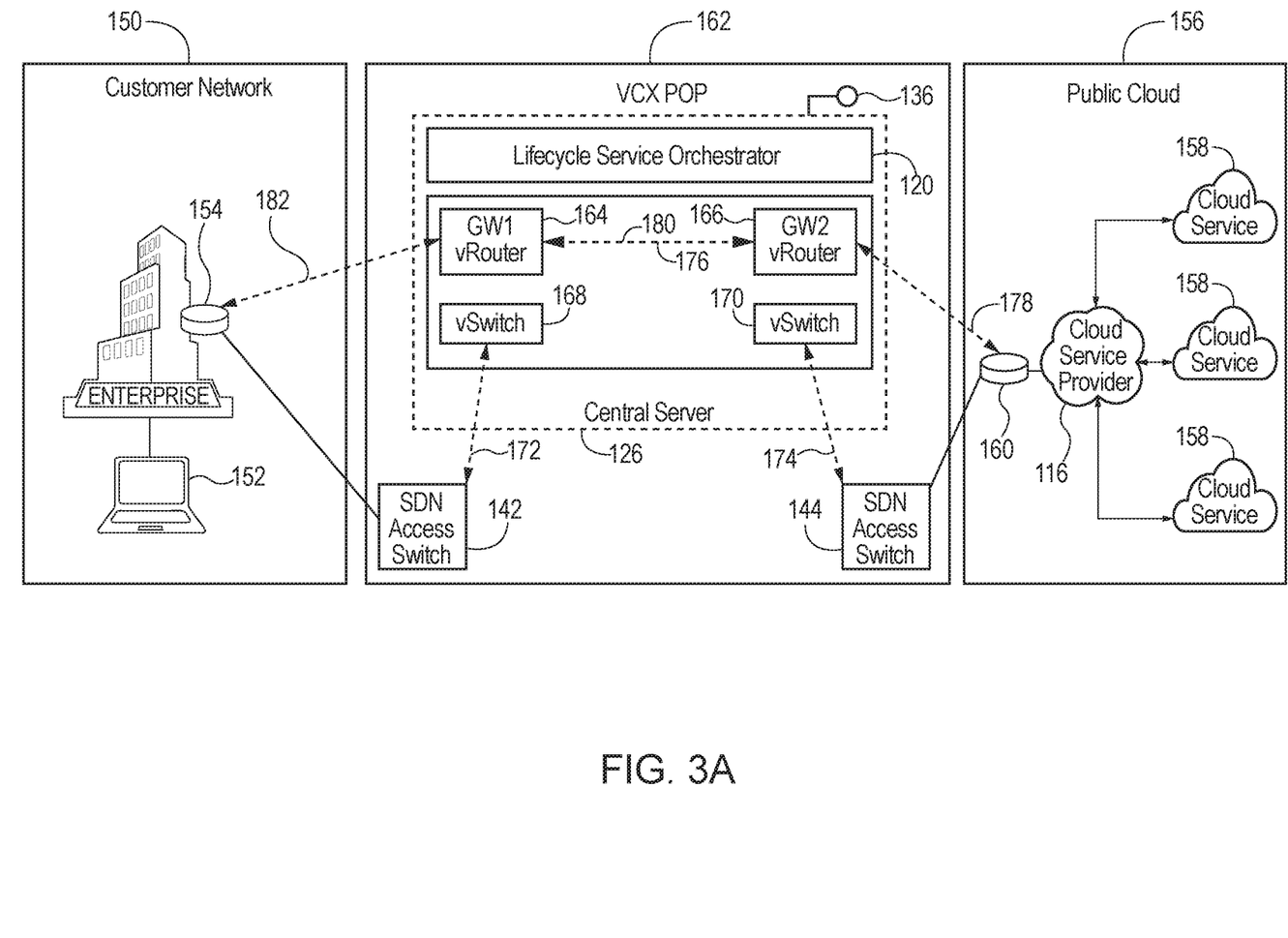
FIG. 3A is a schematic diagram of the network architecture of the VCX according to an exemplary embodiment of the present disclosure, which shows how connectivity is established between an end host in a customer network and services and applications running in a cloud.
Figure 3B:
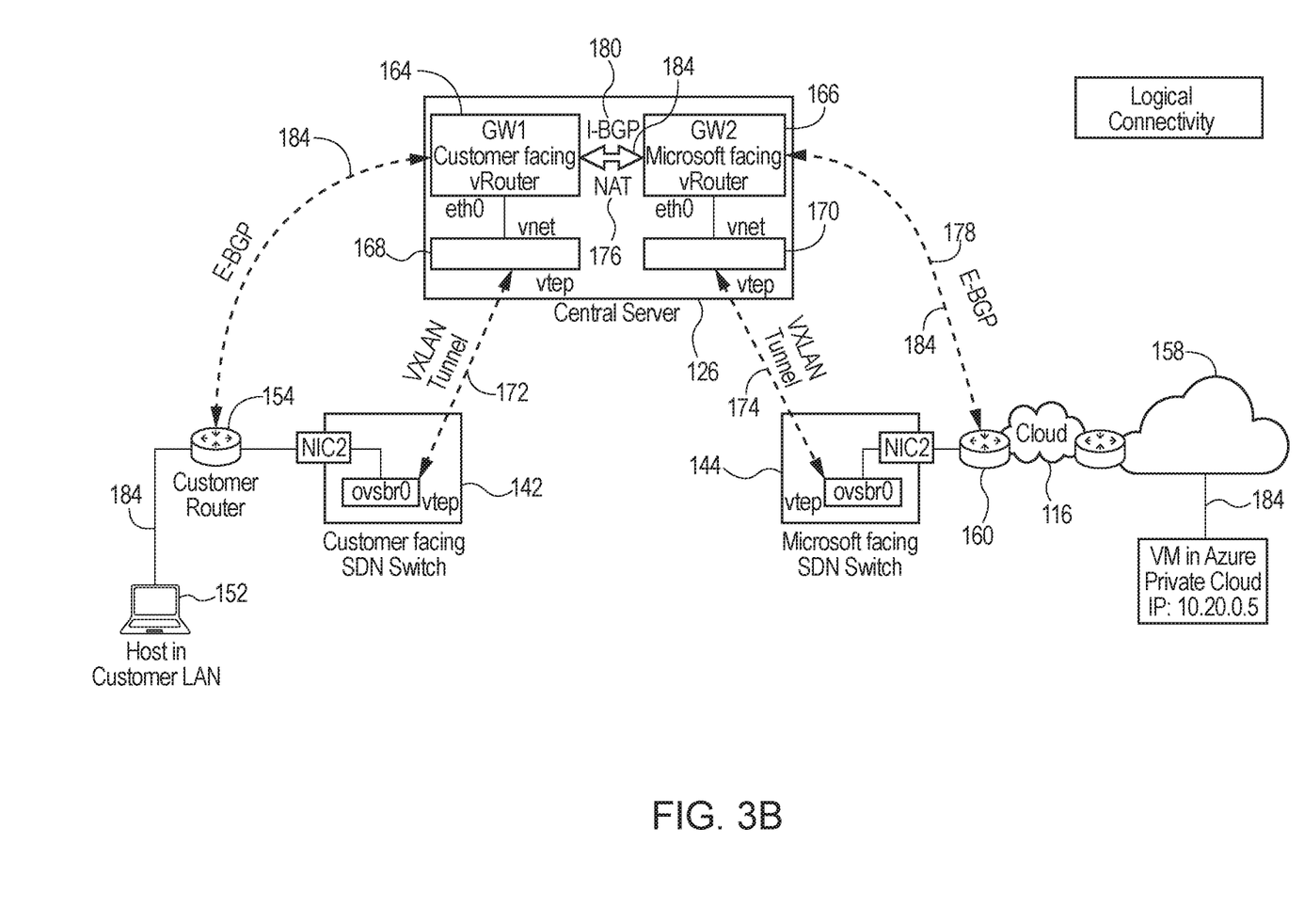
FIG. 3B is a schematic diagram of the network architecture of the VCX according to an exemplary embodiment of the present disclosure, which shows the logical routing established between the host in the customer network and services and applications running in the cloud.
Figure 3C:
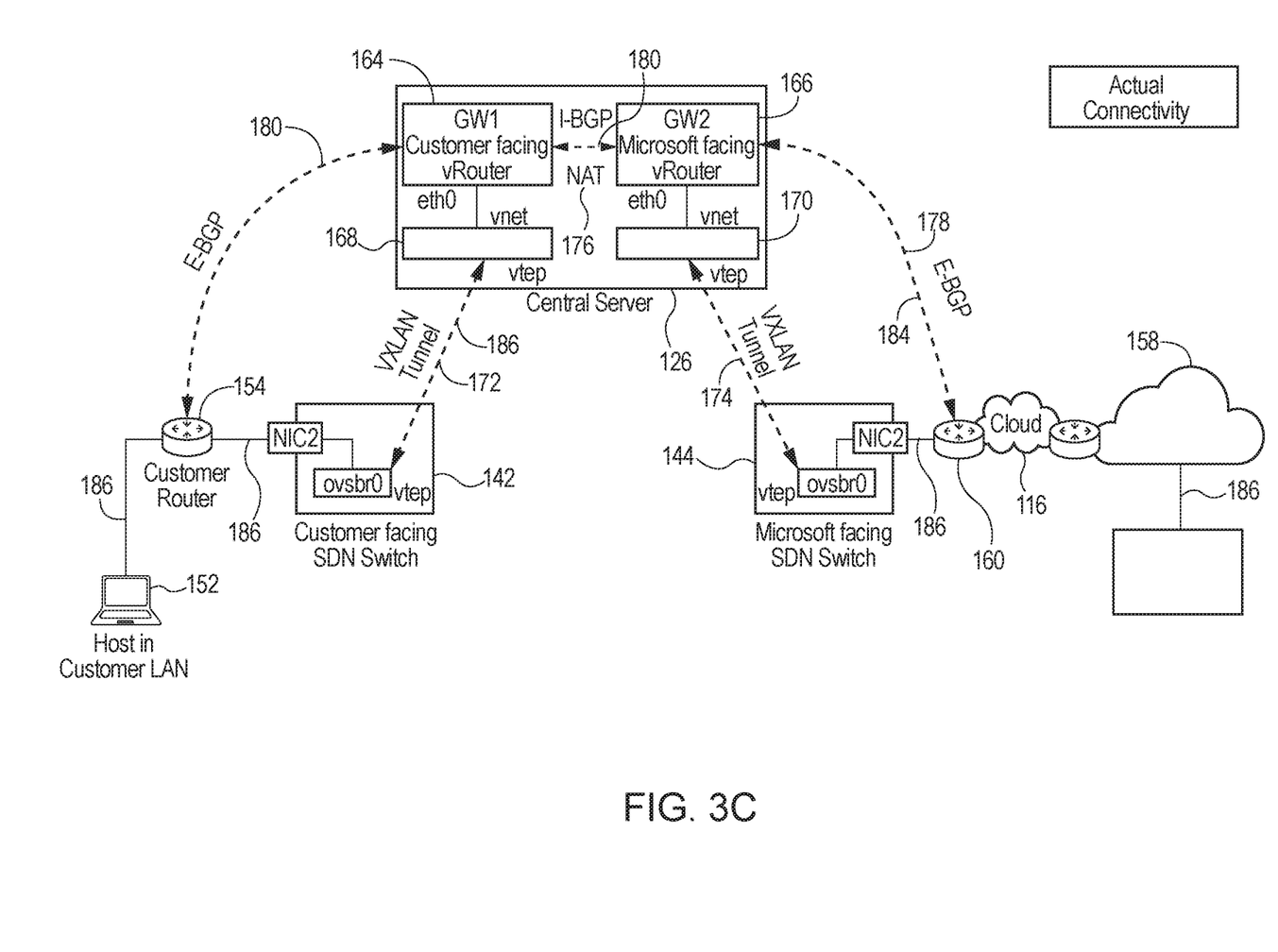
FIG. 3C is a schematic diagram of the network architecture of the VCX according to an exemplary embodiment of the present disclosure, which shows the physical routing established between the host in the customer network and services and applications running in the cloud.

The operation of the VCX 100 will now be described with reference to FIGS. 3A-3C, which graphically illustrate the operation of the VCX according to an exemplary embodiment of the present disclosure, and FIG. 4, which shows the processes or steps of the method performed by VCX 100, according to an exemplary embodiment of the present disclosure. As shown in FIGS. 3A-3C, a host 152, such as a computer or other device connected to customer network 150, is physically connected to one of a plurality of ports of customer facing SDN infrastructure access switch 142, via a router 154 of the customer network 150. The host 152 is operated by a customer who desires to be terminated in order to have access to cloud applications 158 offered by cloud service provider 116 in public or private cloud 156. The cloud service provider 116 in the public or private cloud 156 is connected to one of a plurality of ports of cloud facing SDN infrastructure access switch 144, via a router 160 of the cloud service provider 116, to extend connectivity of the cloud service provider 116 to a VCX Point-of-Presence (POP) 162. The VCX POP 162 includes the central server 126 which hosts the LSO engine 120, the VNFs 164, 166, and the SDN access switches 142, 144.

Figure 4:
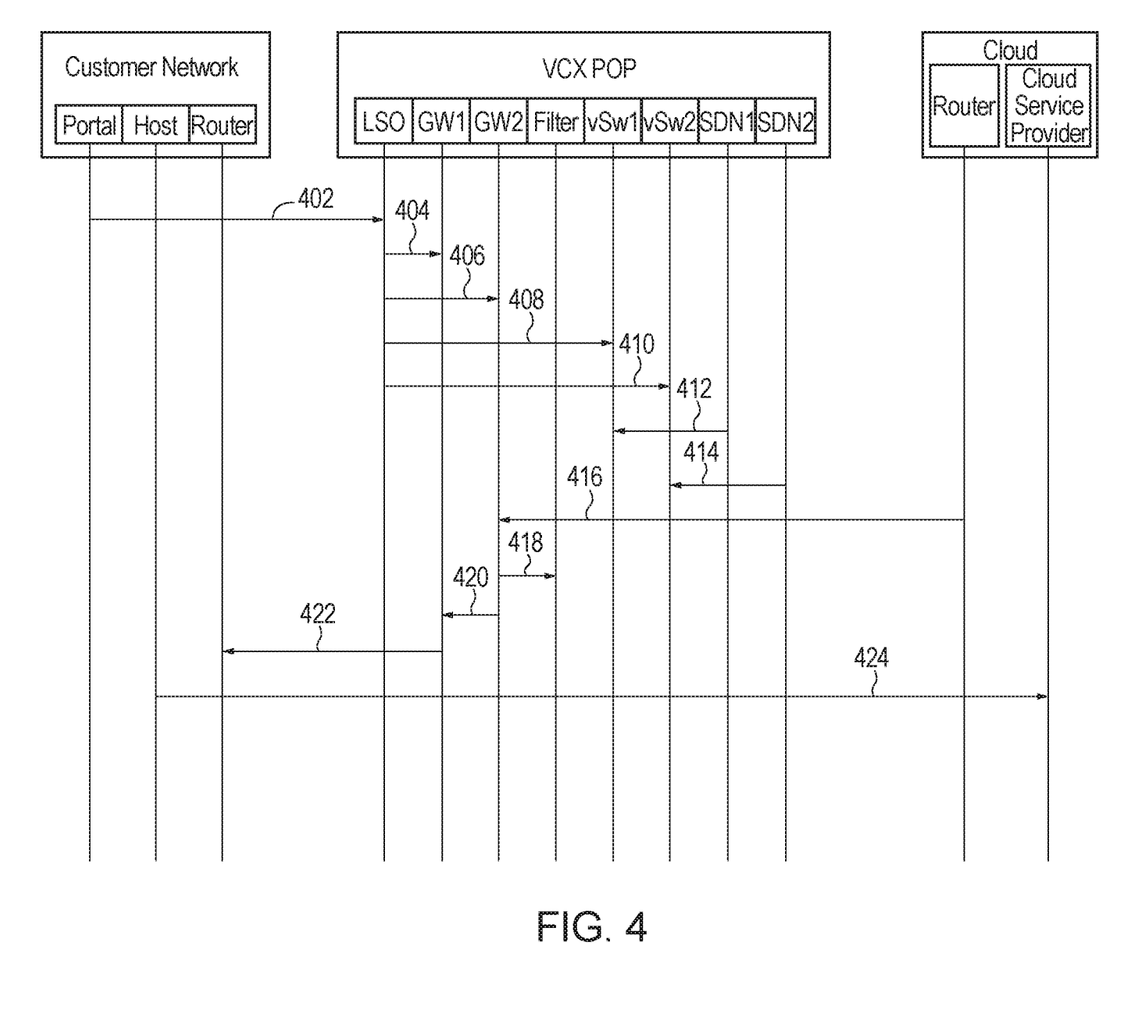
FIG. 4 is a message flow diagram, which shows the processes carried out by the VCX in establishing connectivity between an end host in a customer network and services and applications running in a cloud, according to an exemplary embodiment of the present disclosure.

In process 402 of FIG. 4, a customer uses the self-service portal 136 and LSO 120 to onboard the VNFs 164, 166 on the VCX POP 162 (FIG. 3A), and request automated provisioning, by providing required information for Internet Protocol (IP) route filtering and cloud services 158.

In processes 404-410 of FIG. 4, the NFV orchestrator 138 of the LSO engine 120 instantiates on the NFVI, a first gateway (GW1) VNF 164 (process 404) and a second gateway (GW2) VNF 166 (process 406) for routing and NATing and performs required configuration, e.g., the VIM 130 generates a first open virtual switch (OpenvSwitch) 168 (process 408) and a second OpenvSwitch 170 (process 410), which serve as overlay tunnel endpoints in the central server 126, in response to the customer request. The GW1 VNF 164 can comprise a customer facing virtual router instance and the GW2 VNF 166 can comprise a cloud facing virtual router instance. The GW1 and GW2 VNFs 164, 166 advertise IP routes from the customer network 150 and from the cloud 156, and perform bi-directional NATing, translating the customer network to a public IP address at the cloud end.

In process 406 of FIG. 4, the LSO engine 120 can instantiate additional VNFs 132-1b, 132-2b (FIG. 5) for additional functionalities, such as but not limited to additional security, WAN optimization, etc., based on the requirements of the customer.

In process 412 and 414 of FIG. 4, the customer facing SDN infrastructure access switch 142 generates a first overlay tunnel 172 which connects the SDN infrastructure access switch 142 to the first OpenvSwitch 168 in the central server 126 and the cloud facing SDN infrastructure access switch 144 generates a second overlay tunnel 174 which connects the cloud facing SDN infrastructure access switch 144 to the second OpenvSwitch 170 in the central server 126. The overlay tunnels 172, 174 provide connectivity for establishing Border Gateway Protocol (BGP) sessions and also provide isolation among tenants in a multi-tenant environment.

As shown in FIG. 5, the SDN infrastructure access switches 142, 144 are essentially shared infrastructure among multiple tenants, which can be hyperscaled to millions of tenants in a multi-tenant environment. Each port on the SDN infrastructure access switches 142, 144 represents a separate tenant, i.e., each tenant essentially occupies one of the ports on the customer facing SDN infrastructure switch 142 as well as one of the ports on the cloud facing SDN infrastructure switch 144 for connectivity to its specific cloud provider. Further, each port of each SDN infrastructure access switch 142, 144 is operative as an overlay tunnel endpoint (e.g., a VxLAN Terminal Endpoint (VTEP)), while each OpenvSwitch 168, 170 is operative as the other overlay tunnel endpoint in the central server 126. For every new customer 134-1, 134-2 onboarded on a separate port of the SDN infrastructure access switches 142, 144, a new separate set of VNFs 132-1, 132-2 are generated automatically for them by the NFV orchestrator 138 on the NFVI, which is managed by the VNFM, with the new customer's required IP route policies. Traffic is isolated between the different customers 134-1, 134-2 in the multi-tenant environment by generating separate overlay tunnels with different VxLAN Network Identifier (VNI) IDs.

In process 416 of FIG. 4, IP routes for cloud services are exchanged between cloud service provider router 160 and the cloud facing GW2 VNF (virtual router) 166 of the VCX POP 162 through an external Border Gateway Protocol (E-BGP) session 178, as collectively shown in FIGS. 3A and 3C.

In process 418 of FIG. 4, the IP routes received at the cloud facing virtual router 166 of the VCX POP 162 are filtered by an IP policy controller of the VCX POP 162. The IP policy controller can be a unit the LSO engine 120.

In process 420 of FIG. 4, the cloud facing virtual router 166 and the customer facing virtual router 164 of the VCX POP 162 communicate with one another via an internal Border Gateway Protocol (I-BGP) session 180, as collectively shown in FIGS. 3A-3C, to advertise or leak the IP routes received by the cloud facing virtual router 166 from the cloud service provider router 160 to the customer facing virtual router 164.

In process 422 of FIG. 4, the IP routes received from the cloud service provider router 160 are exchanged between the customer facing virtual router 164 of the VCX POP 162 and the customer router through a second E-BGP session 182.

In process 424 of FIG. 4, end-to-end connectivity established between the host 152 in the customer network 150 and services and applications 158 running in the cloud 156, based on the IP routes received from the cloud service provider router 160 are exchanged between the customer facing virtual router 164 of the VCX POP 162 and the customer router 154, as collectively shown in FIGS. 3A-3C. Reference numeral 184 in FIG. 3B depicts the logical routing established between the host 152 in the customer network 150 and services and applications 158 running in the cloud 156 and Reference numeral 186 in FIG. 3C depicts the physical routing established between the host 152 in the customer network 150 and services and applications 158 running in the cloud 156.

Figure 6:
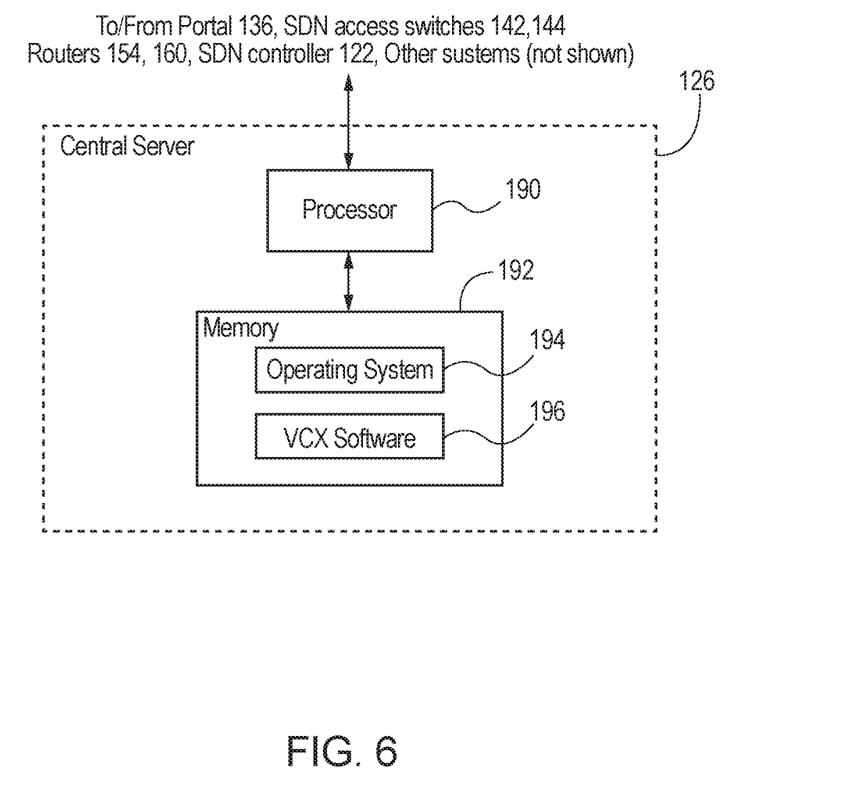
FIG. 6 is a schematic diagram of a hardware platform for a central server according to an exemplary embodiment of the present disclosure.

FIG. 6 depicts a schematic diagram of the central server 126 according to an exemplary embodiment. The central server 126 is a data-processing apparatus whose hardware platform can comprise a processor 190 and a memory 192.

The processor 190 is a processing device such as a microprocessor that is well known in the art. The processor 190 is configured to operate in conjunction with the memory 192 and any other components thereof to execute the VCX software according to the operations and processes described herein.

The memory 192 comprises a non-transitory and non-volatile computer storage memory that is well known in the art, e.g., flash, RAM, etc. The memory 192 stores operating system 194 and the VCX software 196.

It should be clear to those skilled in the art, after reading the present disclosure, that in some alternative embodiments the hardware platform of the central server 190 can be embodied as a multi-processor platform, as a sub-component of a larger computing platform, as a virtual computing element, or in some other computing environment—all within the scope of the present invention. It will be clear to those skilled in the art, after reading the present disclosure, how to make and use the hardware platform for the central server 190.

It should be understood that the invention is not limited to the embodiments illustrated and described herein. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawings.

What is claimed is:

1. A method for establishing connectivity between a host computer in a customer network and a cloud service provider, the method comprising:
   providing a customer facing software defined network (SDN) switch and a cloud service provider facing SDN switch;
   instantiating, with a processor, a customer facing network routing virtual network function (VNF) and a cloud facing network routing VNF;
   configuring, with the processor, a first open virtual switch (vSwitch) associated with the customer facing network routing VNF and a second open vSwitch associated with the cloud facing network routing VNF;
   generating with the customer facing SDN switch a first overlay tunnel between the customer facing SDN switch and the first open vSwitch; and
   generating with the cloud facing SDN switch a second overlay tunnel between the cloud facing SDN switch and the second open vSwitch.

2. The method of claim 1, further comprising instantiating, with the processor, one or more VNFs each based on requirements of a customer, entered at a portal using the host computer.

3. The method of claim 1, further comprising bi-directional network address translating the customer facing network routing VNF and the cloud facing network routing VNF.

4. The method of claim 1, further comprising receiving IP routes for cloud services from a cloud service provider router, at the cloud facing network routing VNF through a first external Border Gateway Protocol session.

5. The method of claim 4, further comprising filtering the IP routes for cloud services received at the cloud facing virtual router with an IP policy controller.

6. The method of claim 4, further comprising advertising the IP routes for cloud services received at the cloud facing virtual router to the customer facing virtual router through an internal Border Gateway Protocol session.

7. The method of claim 6, further comprising receiving the IP routes for cloud services from the customer facing virtual router, at a customer router through a second E-BGP session.

8. The method of claim 1, wherein the first and second overlay tunnels are Virtual Extensive Local Area Network (VxLAN) tunnels.

9. The method of claim 8, wherein the VxLAN tunnels include a unique VxLAN Network Identifier ID corresponding to each tenant of the customer network.

10. A system for establishing connectivity between a host computer in a customer network and a cloud service provider, the system comprising:

a customer facing software defined network (SDN) switch;
a cloud computing service facing SDN switch; and
a processor executing instructions to:
- instantiate a customer facing network routing virtual network function (VNF) and a cloud facing network routing VNF; and
- configure a first open virtual switch (vSwitch) and a second open vSwitch;
- wherein the customer facing SDN switch generates a first overlay tunnel between the customer facing SDN switch and the first open vSwitch; and
- wherein the cloud facing SDN switch generates a second overlay tunnel between the cloud facing SDN switch and the second open vSwitch.

11. The system of claim 10, wherein system comprises Virtual Cloud Exchange.

12. The system of claim 10, further comprising a portal, wherein the processor executes further instructions to instantiate one or more VNFs each based on requirements of a customer, entered at the portal using the host computer.

13. The system of claim 10, wherein the processor executes further instructions to bi-directional network address translate the customer facing network routing VNF and the cloud facing network routing VNF.

14. The system of claim 10, wherein the processor executes further instructions to receive IP routes for cloud services from a cloud service provider router, at the cloud facing network routing VNF through a first external Border Gateway Protocol session.

15. The system of claim 14, wherein the processor executes further instructions to filter the IP routes for cloud services received at the cloud facing virtual router with an IP policy controller.

16. The system of claim 14, wherein the processor executes further instructions to advertise the IP routes for cloud services received at the cloud facing virtual router to the customer facing virtual router through an internal Border Gateway Protocol session.

17. The system of claim 16, wherein the processor executes further instructions to receive the IP routes for cloud services from the customer facing virtual router, at a customer router through a second E-BGP session.

18. The system of claim 10, wherein the first and second overlay tunnels are first and second Virtual Extensive Local Area Network (VxLAN) tunnels.

19. The system of claim 18, wherein the VxLAN tunnels include a unique VxLAN Network Identifier ID corresponding to each tenant of the customer network.

20. The system of claim 10, wherein the processor executes further instructions to deploy a Lifecycle Service Orchestration (LSO) engine.

21. The system of claim 20, wherein the LSO engine deploys a Networks Function Virtualization orchestrator that instantiates the customer facing network routing VNF and the cloud facing network routing VNF.

22. The system of claim 20, wherein the LSO engine further deploys a VNF manager that manages the life cycle of the customer facing network routing VNF and the cloud facing network routing VNF.

23. The system of claim 20, wherein the LSO engine further deploys a virtual infrastructure manager that manages a Networks Function Virtualization Infrastructure.

* * * * *